(12) United States Patent
Baba

(10) Patent No.: US 7,051,369 B1
(45) Date of Patent: May 23, 2006

(54) SYSTEM FOR MONITORING NETWORK FOR CRACKER ATTACK

(76) Inventor: Yoshimi Baba, 644, Futoocho, Kohoku-ku, Yokohama, Kanagawa (JP)

( * ) Notice: Subject to any disclaimer, the term of this patent is extended or adjusted under 35 U.S.C. 154(b) by 0 days.

(21) Appl. No.: 09/494,507

(22) Filed: Jan. 31, 2000

(30) Foreign Application Priority Data

Aug. 18, 1999 (JP) ................................ 11/231127

(51) Int. Cl.
*G06F 17/00* (2006.01)
(52) U.S. Cl. .............................. 726/23; 726/27; 726/22
(58) Field of Classification Search ................ 713/200, 713/201; 726/23, 24, 22
See application file for complete search history.

(56) References Cited

FOREIGN PATENT DOCUMENTS

EP        0 743 777 A    11/1996

OTHER PUBLICATIONS

Terry Escamilla, "Intrusion Detection", 1998, Robert Ipsen.*
Cheswick, "Firewalls and Internet Security", Apr. 1994, First Printing.*
http://techupdate.zdnet.com/techupdate/stories/main/0,14179,2784023,00_print.html.*
http://www.linuxsecurity.com/index2.php?option=com_content&do_pdf=1&id=117265.*
http://www.windowsecurity.com/pages/article_p.asp?id=1189.*

De Vivo et al., "Internet Security Attacks at the Basic Levels," Operating Systems Review (SIGOPS), vol. 32, No. 2, Apr. 1, 1998, pp. 4-15, (XP-000766953).
M. Ranum, "Intrusion detection: ideals, expectations and realities," CSI NetSec Conference, Saint Louis, MO (Jun. 1999).
Press Release, "Cisco Introduces NetRanger Intrusion Detection Solution," (Nov. 1998).
Press Release, "Network Flight Recorder Inc., Announces Commercial Availability," (Jan. 1998).
"FAQ: Network Intrusion Detection Systems," Version 0.6.1, (Aug. 1999).
Sans Institute, "Building a Network Monitoring and Analysis Capability Step by Step," Ver. 1.1.5 (Jul. 1998).
V. Paxson, "Bro: A System for Detecting Network Intruders in Real-Time," Lawrence Berkeley National Laboratory, LBNL-41197, (Jan. 1998).
Simple Nomad, "Strategies for Defeating Distributed Attacks," (date unknown), http://www.nmrc.org.
NightAxis & Rain Forest Puppy, "Purgatory 101: Learning to cope with the SYNs of the Internet," (date unknown), http://www.wiretrip.net.

* cited by examiner

*Primary Examiner*—David Jung
(74) *Attorney, Agent, or Firm*—Paul A. Guss

(57) ABSTRACT

A sensor is provided at the gateway of a local area network for successively acquiring IP packets passing through the gateway. The sensor detects various cracker attacks against the network based on the acquired IP packets. Information as to attacks detected by the sensor is given to a director which controls a firewall at the gateway of the network. Based on the given information, the director controls settings for the firewall to prevent IP packets associated with the detected attacks from entering the local area network.

21 Claims, 1 Drawing Sheet

SYSTEM FOR MONITORING NETWORK FOR CRACKER ATTACK

BACKGROUND OF THE INVENTION

1. Field of the Invention

The present invention relates to a system for monitoring a local area network (LAN) for attacks made by crackers via the Internet, and protecting the network against those attacks.

2. Description of the Related Art

In recent years, many local area networks (LANs) constructed in organizations such as companies are connected to the Internet for exchanging various items of information or communicating with other networks. For such communications, the IP (Internet Protocol) is used as a protocol mainly corresponding to a network layer in a so-called OSI hierarchical model, and communication data are exchanged in the form of IP packets. It is customary to use the TCP (Transmission Control Protocol) or the UDP (User Datagram Protocol) as a protocol mainly corresponding to a transport layer that is higher in rank than the above network layer.

The networks of the type described above are advantageous in that they can exchange a wide variety of different items of information at a low cost with servers and other networks on the Internet. However, since the Internet is highly accessible to the public, the networks connected to the Internet are always subject to attacks from so-called crackers (i.e. ill-willed hackers). Therefore, the networks are required to be protected against such attacks.

One known system for protecting a network against attacks is a firewall (specifically, a computer having the function of a firewall) at the gateway of the network. The firewall serves to prevent communications of the types prescribed by the network administrator from occurring between the network and external networks. The types of such communications can be specified by source IP addresses, destination IP addresses, and destination port numbers that are contained in IP packets, for example.

The firewall is capable of inhibiting hosts (computers) which have certain IP addresses in the network and certain port numbers of the hosts from being accessed from external networks, and also inhibiting the network from being accessed by IP addresses other than certain IP addresses outside of the network. Consequently, if the types of communication data that are to be inhibited from entering the network are rigorously established with respect to the firewall, then it is possible for the firewall to reduce the danger of attacks against the network.

However, in order for the network administrator to establish those types of communication data, the network administrator needs to have a high level of knowledge and understanding about a wide range of network-related technologies, including communication technology, network technology, and cracker's attack schemes, and also to be well knowledgeable about individual network's structures and operating details.

The types of communications to be blocked by the firewall have to be determined in view of what information is to be used and provided to external networks by hosts in the network to be protected, what information is to be protected in the network, and what attacks are expected to be launched on the network. Highly skilled network engineers are required to determine those types of communications to be blocked by the firewall. If the scale of a network to be protected is relatively large or a network to be protected handles a vast variety of information, then it is difficult for even highly skilled network engineers to make appropriate settings for the types of communications to be blocked by the firewall. When the structure of a network is changed, or a network is actually attacked by a cracker, or a newly planned attack is launched on a network, it is often necessary to reconstruct settings for the firewall. To this end, the entire system including the firewall needs to be continuously operated and managed.

Consequently, establishing proper settings for a firewall and continuously operating and managing a firewall require a large expenditure of labor of skilled engineers and a large expenditure of cost.

The conventional firewall of a network is designed to preclude all communications which are possible to attack the network. Therefore, the types of communications that are inhibited by firewall settings are uniformly excluded regardless of whether those communications are due to cracker's attacks. Stated otherwise, the freedom of communications between the network and external networks is unduly limited. Accordingly, a network with a firewall suffers a limitation on information providing services that are available on the Internet. As a result, the network is unable to enjoy many information resources on the Internet.

SUMMARY OF THE INVENTION

It is therefore an object of the present invention to provide a network monitoring system of a simple arrangement which is capable of automatically detecting a cracker attack on a network and protecting the network against the cracker attack without imposing undue limitations on the traffic of communications and also without requiring the labor of a skilled engineer.

To achieve the above object, there is provided in accordance with the present invention a system for monitoring a network which performs communications based on IP (Internet Protocol), for a cracker attack, comprising attack detecting means disposed at a gateway of the network, for successively acquiring IP packets passing through the gateway, storing the acquired IP packets accumulatively, and monitoring the stored IP packets to detect a cracker attack against the network, and processing means for effecting a predetermined process depending on the detected type of cracker attack when the attack detecting means detects the cracker attack.

The inventors of the present invention have studied various cracker attack schemes, and found that each of many attack types has characteristic relation to a plurality of IP packets which are transmitted successively or intermittently when each of the attacks happens. Therefore, when IP packets passing through the gateway of the network are successively acquired, stored and monitored, it is possible to detect a cracker attack against the local area network on a real-time basis. When a cracker attack is detected, the processing means takes an appropriate action such as alarming to a network administrator or cutting off communications from the cracker for thereby protecting the network against the attack. Generally, it takes a relatively long period of time before a cracker attack produces a sufficient effect on the network. Therefore, any damage to the network by a cracker attack can sufficiently be held to a minimum by taking an action to protect the network when the cracker attack is detected or with a slight delay after the cracker attack is detected.

Since the system according to the present invention can detect a cracker attach on a real-time basis, a protective measure may be taken only when the cracker attack is detected. Therefore, the network administrator or security personnel are not required to refer to a log file (communication records) as frequently as heretofore. Furthermore, an expenditure of labor for predicting cracker attacks on the network may be reduced when the network is constructed or rearranged. When no cracker attacks are detected, it is not necessary to limit communications between the network and external networks in anticipation of possible cracker attacks, and hence the freedom of communications between the network and external networks can be increased.

Consequently, the system according to the present invention is of a relatively simple arrangement and capable of automatically detecting a cracker attack on the network and protecting the network against the cracker attack without imposing undue limitations on the traffic of communications and also without requiring the labor of a skilled engineer.

The attack detecting means may comprise means for receiving all IP packets passing through the gateway of the network. This allows cracker attacks of many types to be detected quickly.

The attack detecting means may comprise means for receiving only IP packets.

Because the attack detecting means does not transmit its own information such as its own IP address and MAC (Media Access Control) address to the network, the attack detecting means is not recognized for its existence and not attacked by crackers. Thus, the attack detecting means is secure and the system is reliable.

The attack detecting means may comprise means for holding an algorithm for detecting a plurality of different types of cracker attacks, and detecting the types of cracker attacks from the IP packets acquired and stored by the attack detecting means based on the algorithm.

The algorithm can detect a plurality of types of cracker attacks for increased security of the network. The algorithm may be updated for protection against attacks of new types.

The attack detecting means may comprise means for classifying a plurality of the IP packets acquired and stored by the attack detecting means according to at least source IP addresses and/or destination IP addresses and holding the classified IP packets, and detecting the types of cracker attacks from the classified IP packets.

In order to detect attacks of plural types, source IP addresses and destination IP addresses (which are given to IP headers) of IP packets often provide an important key. When IP packets acquired within a predetermined time are classified according to source IP addresses and/or destination IP addresses and held, cracker attacks can easily be detected from the IP packets.

Specifically, the attack detecting means detect attacks of various types as follows:

An attack of a first type made by crackers is generally called a "port scan". The attack of this type does not directly cause damage to the network, but is frequently used as a preliminary attack. For making the attack of this type, the cracker repeatedly transmits IP packets from its own managed host to the network under attack while changing destination IP addresses and destination port numbers in the IP packets, and observes responses to the transmitted IP packets for thereby searching for an IP address and a port number that are used by the network for communication with external networks without being limited by a firewall or the like. The port number represents a service type, e.g., telnet, ftp, smtp, tftp, or the like, of application software on TCP or UDP, and serves as data given to a TCP header or a UDP header in the IP packet.

In the port scan attack, the above IP packets are usually transmitted using dedicated tool software, and a number of IP packets whose destination IP addresses and port numbers are different from each other and whose source IP addresses are the same as each other are transmitted to the network under attack within a relatively short time.

According to the present invention, the attack detecting means may comprise means for detecting a cracker attack of a first type when the IP packets acquired and stored by the attack detecting means include at least a predetermined number of IP packets, which are transmitted to the network from an external network within a predetermined time, and whose at least source IP addresses are the same as each other and whose destination IP addresses or destination port numbers are different from each other.

In this manner, the system is capable of reliably detecting an attack of the first type called a port scan.

An attack of a second type made by crackers is generally called "Syn-flood (TCP Syn-flood)". The attack of this type makes a host in the network go down using the characteristics of the TCP.

Specifically, for performing communications between two host according to the TCP, a logical connection is opened between the hosts. For opening such a logical connection, a Syn IP packet (an IP packet containing TCP Syn-signal) is transmitted from one of the hosts to the other. The Syn IP packet containing is an IP packet whose source IP address is the IP address of the one host and whose destination IP address is the IP address of the other host, with only a Syn bit of Syn and Ack bits in the TCP header in the IP packet being set to "1".

In opening the connection, the other host which has received the Syn IP packet transmits a Sym/Ack IP packet (an IP packet containing TCP Syn/Ack signal) to the one host. The Sym/Ack IP packet is an IP packet whose source IP address is the IP address of the other host and whose destination IP address is the IP address of the one host, with both Syn and Ack bits in the TCP header in the IP packet being set to "1".

In opening the connection, the one host which has received the Syn/Ack IP packet transmits an Ack IP packet to the other host. When the other host receives the Ack IP packet, the logical connection is opened between the two hosts. The Ack IP packet is an IP packet whose source IP address and destination IP address are the same as the Syn IP packet, with only an Ack bit of Syn and Ack bits in the TCP header in the IP packet being set to "1".

The Syn-flood is an attack using the above characteristics of the TCP. In this attack, the cracker transmits a number of Syn IP packets to a particular host in the network under attack within a relatively short time. When a Syn/Ack IP packet is transmitted from the particular host in response to the Syn IP packets, the cracker does not transmit an Ack IP packet. When this attack is made, the particular host transmits a Syn/Ack IP packet in response to the first transmitted Syn IP packet, and thereafter waits for an Ack IP packet for a predetermined time (generally 2 minutes) unless an Ack IP packet is transmitted within the predetermined time. Each time a new Syn IP packet is transmitted, the particular host stores in a communication processing buffer area information as to the new Syn IP packet in order to successively complete connection opening processes for the new Syn IP packets. Since the buffer area has a limited size, when the buffer area becomes full, the particular host can no longer perform communications according the TCP and services on the TCP. As a result, the particular host under attack goes down.

In the attack of this type (Syn-flood), as described above, a relatively large number of Syn IP packets are transmitted to a particular host under attack, i.e., a host having a particular IP address, in the network within a relatively short time. In response to the transmitted Syn IP packets, the particular host transmits many Syn/Ack IP packets out of the network within a relatively short time. However, an Ack packet to be finally transmitted to the particular host in response to the Syn IP packets or the Syn/Ack IP packets is not transmitted.

According to the present invention, the attack detecting means may comprise means for detecting a cracker attack of a second type when the IP packets acquired and stored by the attack detecting means include at least a predetermined number of Syn IP packets based on TCP, which are transmitted to the network from an external network within a predetermined time, and whose at least destination IP addresses are the same as each other, and when an Ack IP packet based on the TCP which has the same source IP address and destination IP address as each of the Syn IP packets is not acquired within the predetermined time.

Alternatively, the attack detecting means may comprise means for detecting a cracker attack of a second type when the IP packets acquired and stored by the attack detecting means include at least a predetermined number of Syn/Ack IP packets based on TCP, which are transmitted to the network from an external network within a predetermined time, and whose at least destination IP addresses are the same as each other, and when an Ack IP packet based on the TCP which has the same source IP address and destination IP address as the source IP address and destination IP address of each of the Syn/Ack IP packets is not acquired within the predetermined time.

Consequently, the attack of the second type known as Syn-flood can reliably be detected.

An attack of a third type made by crackers is generally called "Teardrop". The attack of this type makes a host in the network go down using the characteristics of a process of dividing an IP packet (so-called IP fragments).

While an IP packet is transferred via routers in the Internet, the IP packet may possibly be divided due to the data processing capacity of each router. An error may possibly occur for example depending on the bad condition of telephone line when an IP packet is transferred via many routers, and when such an error occurs, the router retransmits the IP packet. Therefore, a host having the destination IP address of the IP packet may receive a plurality of divisions of the same IP packet. In communications based on the IP layer, when a host for finally receiving an IP packet, i.e., a host having the destination IP address, has received divisions of an IP packet, the host stores the received divisions of the IP packet until it receives all the remaining divisions of the IP packet. When the host has received all the divisions of the IP packet, the host processes the divisions of the IP packet to restore the data of the original IP packet.

The "Teardrop" is an attack using the characteristics of the process of divided IP packets. In this attack, the cracker transmits a number of the same divisions of an IP packet to a particular host in the network under attack, and then transmits the remaining divisions of the IP packet to the particular host. Under this attack, when the particular host has finally received the remaining divisions of the IP packet, the particular host performs a process of restoring the original IP packet from the remaining divisions of the IP packet and the previously transmitted divisions of the IP packet. Since such a restoring process uses big size of memory and takes a long period of time to perform, the particular host goes down in reality.

In the attack of this type (Teardrop), a number of the same divisions of an IP packet are transmitted to a certain host in the network within a relatively short time.

According to the present invention, the attack detecting means may comprise means for detecting a cracker attack of a third type when the IP packets acquired and stored by the attack detecting means include at least a predetermined number of same divisions of an IP packet, which are transmitted to the network from an external network within a predetermined time.

As a consequence, the attack of the third type known as Teardrop can reliably be detected.

An attack of a fourth type made by crackers is generally called "Land". The attack of this type is an attack to transmit an IP packet whose source IP address and destination IP address are the same as each other, i.e., an IP packet which does not normally occur, to a particular host in the network under attack. The particular host to which such an IP packet is transmitted often needs a time-consuming process to process the IP packet, and frequently goes down.

In the attach of this type, an IP packet whose source IP address and destination IP address are the same as each other is transmitted to the particular host in the network. Generally, a plurality of such IP packets are transmitted to the particular host in a relatively short time.

According to the present invention, the attack detecting means may comprise means for detecting a cracker attack of a fourth type when the IP packets acquired and stored by the attack detecting means include at least a predetermined number of IP packets, which are transmitted to the network from an external network within a predetermined time, and whose source IP addresses are the same as destination IP addresses thereof.

Thus, the attack of the fourth type called Land can reliably be detected.

The above attacks known as Syn-flood, Teardrop, and Land generally belong to attacks called DoS (Denial of Service). The DoS also includes an attack type called Smurf and an attack type called Floodie. Though the attacks called Syn-flood, Teardrop, and Land have been described as examples, the system according to the present invention may be arranged to detect attacks called Smurf and Floodie.

An attack of a fifth type made by crackers is an attack attempting to acquire the password of a user of a particular host in the network. In this attack, the cracker logs in the particular host according to telnet or the like, using a user name of the particular host in the network under attack, and attempts to operate the host using a number of passwords selected from a certain dictionary file or the like. If the cracker can operate the host with a password, then the cracker is able to recognize the password. In general, passwords can be entered into the host in an infinite number of attempts. Accordingly, the cracker can acquire a password if the entry of passwords is attempted in a long period of time.

In the attack of this type, a number of IP packets having the same user name data and also having passwords which are different from each other are transmitted to a particular host in the network under attack.

According to the present invention, therefore, the attack detecting means may comprise means for detecting a cracker attack of a fifth type when the IP packets acquired and stored by the attack detecting means include at least a predetermined number of IP packets, which are transmitted to the network from an external network in order to operate a host in the network within a predetermined time, and whose user name data of the host are the same as each other and whose passwords of the host are different from each other.

Consequently, the attack attempting to acquire a password can reliably be detected.

An attack of a sixth type made by crackers is an attack to cause a particular host in the network to perform a process (so-called route command) that can only be executed by limited persons such as the network administrator with a dedicated password entered. This attack uses a bug referred to as a security hole of an OS (Operating System) installed in the host under attack.

Specifically, a host with UNIX (trademark of AT&T) installed as the OS has a security hole referred to as a buffer overflow. The security hole is such that when relatively large data (representing 128 or more characters) is transmitted at once for "lpr" indicative of a printer logical name, the buffer overflows, and the overflowing data is a route command, the route command is executed even if a password of the network administrator is not entered.

The attack of the sixth type attacks a security hole referred to as a buffer overflow. In this attack, an IP packet having a data sequence including a predetermined pattern of data, such as a data sequence having at least a predetermined size for "lpr", is transmitted to the particular host in the network.

Therefore, according to the present invention, the attack detecting means may comprise means for detecting a cracker attack of a sixth type when the IP packets acquired and stored by the attack detecting means include an IP packet which has a data sequence having a predetermined pattern of data for attacking a buffer overflow security hole.

The attack of the sixth type can thus be detected.

The processing means may comprise means for generating a report output representing the detection of the cracker attack in the predetermined process. The report output thus generated allows the network administrator or an outside engineer to take a measure for excluding the detected attack.

The processing means may comprise means for preventing an IP packet having a source IP address and/or a destination IP address associated with the attack detected by the attack detecting means, from entering the network in the predetermined process, for a predetermined time after the attack detecting means detects the attack.

Therefore, communications from the cracker to the network or communications to the host under attack are automatically cut off, protecting the network on a real-time basis in response to the detection of the attack. And the lapse of the predetermined time after the attack detecting means detected the last attack makes free communications between the network and the external network possible without limitation of predetermined process by the processing means.

More specifically, the processing means may comprise means for preventing an IP packet having the same source IP address as the source IP addresses associated with the attack of the first type detected by the attack detecting means, from entering the network for a predetermined time after the attack detecting means detects the attack of the first type, in the predetermined process.

Since the source IP address is the IP address of the host which the cracker is using in the port scan attack, the IP packet transmitted to the network with the above IP address as its source IP address is blocked from the network for the predetermined time after the attack is detected. Therefore, the cracker is unable to communicate with the network from the host having the above source IP address for the predetermined time after the attack is detected, and cannot obtain information relative to the network. Insofar as the port scan attack is continuously made, it is detected from time to time. Therefore, while the port scan attack is continuing, the cracker is unable to communicate with the network in reality.

If the attack of the second type referred to as Syn-flood is detected on the basis of the Syn IP packet as described above, then the processing means may comprise means for preventing an IP packet having the same destination IP address as each the Syn IP packet from entering the network for a predetermined time after the attack detecting means detects the attack of the second type, in the predetermined process.

Specifically, since the destination IP address of each the Syn IP packet is the IP address of the host attacked by Syn-flood, the IP packet having the IP address of the host as the destination IP address is blocked from the network for the predetermined time after the attack detecting means detects the attack.

If the Syn-flood attack is detected on the basis of the Syn/Ack IP packet as described above, then the processing means may comprise means for preventing an IP packet having the same destination IP address as the source IP address of each the Syn/Ack IP packet from entering the network for a predetermined time after the attack detecting means detects the attack of the second type, in the predetermined process.

Specifically, each the Syn/Ack IP packet is a packet with which the host in the network responds to the cracker with respect to a Syn IP packet transmitted to the network from a host under the control of the cracker attempting to make the Syn-flood attack. Therefore, the source IP address of each the Syn/Ack IP packet is the IP address of the host under the Syn-flood attack. Therefore, the IP packet transmitted to the network with the IP address of the host in the network being used as the destination IP address is blocked from the network.

As described above, because the IP packet of the Syn-flood attack is prevented from entering the network, no IP packets such as Syn IP packets are transmitted to the host in the network under attack for the predetermined time. If the host under attack fails to normally complete the opening of a connection within a certain time (normally 2 minutes) with respect to the previously transmitted Syn IP packet, then the host automatically stops opening the connection. Accordingly, the host can recover its normal state within the predetermined time because no IP packets are transmitted for the predetermined time.

Therefore, according to the present invention, the processing means may comprise means for preventing an IP packet having the same source IP address as each the Syn IP packet from entering the network for a predetermined time after the attack detecting means detects the attack of the second type, in the predetermined process.

Alternatively, the processing means may comprise means for preventing an IP packet having the same source IP address as the destination IP address of each the Syn/Ack IP packet from entering the network for a predetermined time after the attack detecting means detects the attack of the second type, in the predetermined process.

Specifically, in the Syn-flood attack, when the cracker transmits Syn-flood IP packets, the cracker may falsify source IP addresses or change source IP addresses. Generally, however, the source IP address of each the Syn IP packet or the destination IP address of a corresponding Syn/Ack IP packet is highly likely to be the IP address of the host under the control of the cracker. Therefore, the IP packet with the above IP address used as the destination IP address is blocked from the network for the predetermined time after the attack is detected. The network can thus be protected more effectively against the cracker attack.

Furthermore, the predetermined time for which an IP packet having the same source IP address as each the Syn IP packet or the same source IP address as the destination IP address of each the Syn/Ack IP packet is prevented from entering the network is longer than the predetermined time for which an IP packet having the same destination IP address as each the Syn IP packet or the same destination IP address as the source IP address of each the Syn/Ack IP packet is prevented from entering the network.

Specifically, the time for which communications with the host under the Syn-flood attack are cut off, i.e., the latter predetermined time, is sufficient if it is about a time in which the host can recover its normal state from the attack. However, the time for which communications from the host highly possibly under the control of the cracker to the network, i.e., the former predetermined time, should preferably be relatively long for the standpoint of network protection. Accordingly, the former predetermined time is made longer than the latter predetermined time.

With the above time settings, it is possible to sufficiently protect the network against the Syn-flood attack while providing as much freedom as possible of communications between hosts in the network and external networks.

If the attack of the third type referred to as Teardrop is detected, then the processing means may comprise means for preventing an IP packet having the same destination IP address as the destination IP address of each the divided IP packet from entering the network for a predetermined time after the attack detecting means detects the attack of the third type, in the predetermined process.

Specifically, the destination IP address of the divided IP packet is the IP address of the host under the Teardrop attack. Therefore, the IP packet having the IP address of the host as its destination IP address is blocked from the network for the predetermined time after the attack is detected. Therefore, IP packets such as divided IP packets are not transmitted to the host in the network under the Teardrop attack for the predetermined time. Unless the host under attack receives remaining divided IP packets corresponding to the previously transmitted divided IP packets within a certain time (normally 2 minutes), the host automatically stops communications based on those IP packets. Accordingly, since no IP packets are transmitted for the predetermined time, the host can recover its normal state within the predetermined time.

According to the present invention, furthermore, if the Teardrop attack is detected, then the processing means may comprise means for preventing an IP packet having the same source IP address as the source IP address of each the divided IP packet from entering the network for a predetermined time after the attack detecting means detects the attack of the third type, in the predetermined process.

As with the Syn-flood attack, the source IP address of the divided IP packet is highly likely to be the IP address of the host under the control of the cracker. Therefore, the IP packet with the above IP address used as the source IP address is blocked from the network for the predetermined time after the attack is detected. The network can thus be protected more effectively against the cracker attack.

The predetermined time for which an IP packet having the same source IP address as the source IP address of each the divided IP packet is prevented from entering the network is longer than the predetermined time for which an IP packet having the same destination IP address as the destination IP address of each the divided IP packet is prevented from entering the network.

Specifically, as with the Syn-flood attack, the time for which communications with the host under the Teardrop attack are cut off, i.e., the latter predetermined time, is sufficient if it is about a time in which the host can recover its normal state from the attack. However, the time for which communications from the host highly possibly under the control of the cracker to the network, i.e., the former predetermined time, should preferably be relatively long for the standpoint of network protection. Accordingly, the former predetermined time is made longer than the latter predetermined time.

With the above time settings, it is possible to sufficiently protect the network against the Teardrop attack while providing as much freedom as possible of communications between hosts in the network and external networks.

If the attack of the fourth type called Land is detected, the processing means may comprise means for preventing an IP packet having the same source IP address and destination IP address as each the IP packet associated with the attack of the fourth type from entering the network for a predetermined time after the attack detecting means detects the attack of the fourth type, in the predetermined process.

In the Land attack, an IP packet whose source IP address and destination IP address are the same as each other is transmitted. Therefore, the IP packet having the same source IP address and destination IP address as the above IP packet is blocked from the network for the predetermined time after the attack is detected. Therefore, the network can be protected against the Land attack.

If the attack of the fifth type attempting to acquire the password of a user of the host in the network, then the processing means may comprise means for preventing an IP packet having the same source IP address and destination IP address as each the IP packet associated with the attack of the fifth type from entering the network for a predetermined time after the attack detecting means detects the attack of the fifth type, in the predetermined process.

Specifically, the destination IP address of the IP packet associated with the attack of the fifth type is the IP address of the host under attack. The source IP address of the IP packet is the IP address of the host under the control of the cracker. Therefore, the IP packet having the same source IP address and destination IP address as the IP packet associated with the attack of the fifth type is blocked from the network for the predetermined time after the attack is detected. Thus, even when the cracker transmits IP packets having various passwords to a particular host in the network, the cracker is unable to decide whether the particular host can be operated with each of the passwords. As a result, the network can be protected against the attack of the fifth type.

If the attack of the sixth type using a securing hole is detected, then the processing means may comprise means for preventing an IP packet having the same source IP address and destination IP address as the IP packet associated with the attack of the sixth type from entering the network for a predetermined time after the attack detecting means detects the attack of the sixth type, in the predetermined process.

Specifically, the destination IP address of the IP packet associated with the attack of the sixth type is the IP address of the host under attack. The source IP address of the IP packet is the IP address of the host under the control of the cracker. Therefore, the IP packet having the same source IP address and destination IP address as the IP packet associated with the attack of the sixth type is blocked from the network for the predetermined time after the attack is detected. Thus, even when the cracker transmits an IP packet for attacking a security hole in a particular host in the network, the IP packet is not given to the particular host. As a consequence, it is impossible to cause the particular host to execute a route command, and the network can be protected against the attack of the sixth type.

To protect the network from several types of attacks especially, there is provided in accordance with the present invention a system for monitoring a network which performs communications based on IP (Internet Protocol), for a cracker attack, comprising attack detecting means disposed at a gateway of the network, for successively acquiring IP packets passing through the gateway, storing the acquired IP packets accumulatively, holding an algorithm for detecting a plurality of different types of cracker attacks, and monitoring to detect the types of cracker attacks from the acquired and stored IP packets based on the algorithm, and processing means for preventing an IP packet having a source IP address and/or a destination IP address associated with the attack detected by the attack detecting means, from entering the network according to a predetermined process, for a time which is predetermined corresponding to the detected type of attack, after the attack detecting means detects one of the attacks.

It is possible to keep down the predetermined time for preventing the IP packet having a source IP address and/or a destination IP address from entering the network corresponding to each of the several types of the attacks, by preventing an IP packet having a source IP address and/or a destination IP address associated with the attack detected by the attack detecting means, from entering the network in the predetermined process, for a time, which is predetermined corresponding to the type of the attacks, after the attack detecting means detects one of the attacks. Consequently the maximum number of opportunities of the communications between the network and the external network come under the condition that the attacks are not detected by the attack detecting means, so the communications using the Internet are made more convenient.

The system according to the present invention which automatically prevents IP packets associated with attacks of various types from entering the network depending on the detection of the attacks, further comprises a packet filter disposed at the gateway of the network, for selectively establishing IP packets to be prevented from entering the network, the processing means comprising means for controlling the packet filter to perform the predetermined process.

If the packet filter comprises a firewall, for example, then the system according to the present invention can be constructed using an existing system. Generally, a router also has a function as a packet filter though it is less capable of selecting and discarding IP packets than the firewall. Accordingly, the router can also be used as the packet filter.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
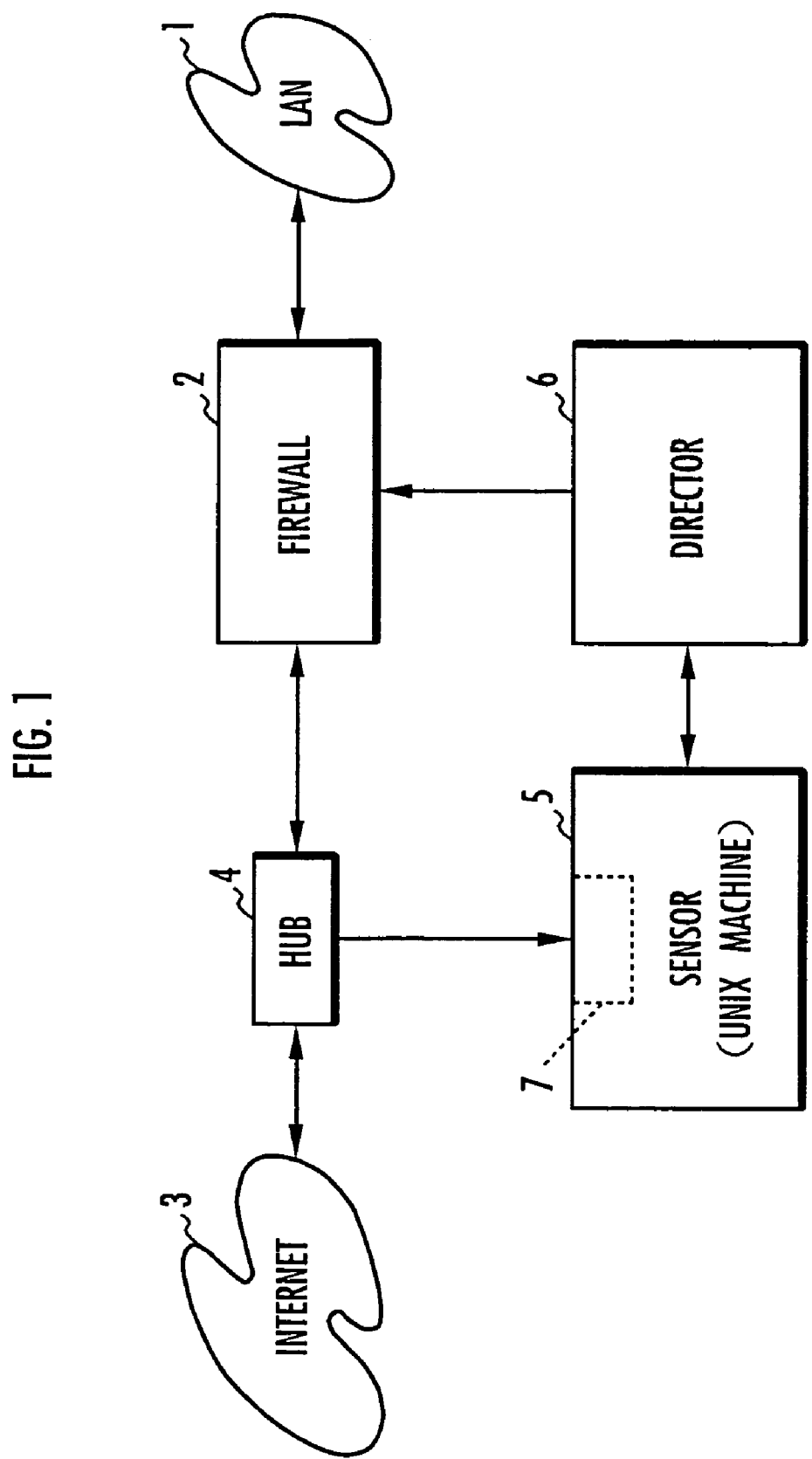
FIG. 1 is a block diagram of a system for monitoring a network for a cracker attack according to the present invention.

As shown in FIG. 1, a local area network (LAN) 1, which is constructed using the Ethernet, comprises a plurality of hosts (computers), interconnected by Ethernet cables and hubs, not shown. Each of the hosts has an Ethernet card connected to the Ethernet cable, software for processing TCP/IP, and various application software, e.g., telnet, ftp, smtp, etc. functioning on TCP/IP, for making is possible to perform communications based on IP.

The LAN 1 is not limited to being constructed using the Ethernet, but may also be constructed as another network form such as a token-ring network.

A system for monitoring the LAN 1 for a cracker attack according to the present invention has a computer 2 (hereinafter referred to as a firewall 2) having the function of a firewall as a packet filter. The LAN 1 is connected via the firewall 2 to the Internet 3. The firewall 2 has a file of written data (hereinafter referred to as a filter setting file) prescribing what types of IP packets are inhibited from entering the LAN 1. When an IP packet of a type which is prescribed in the filter setting file as being inhibited from entering the LAN 1 is transmitted from the Internet 3, the firewall 2 discards the IP packet, and prevents the IP packet from entering the LAN 1. When an IP packet which is not prescribed in the filter setting file as being inhibited from entering the LAN 1 is transmitted from the Internet 3, the firewall 2 transfers the IP packet to the LAN 1.

Between the firewall 2 and the Internet 3, there is interposed a hub 4 connected to a sensor 5 which functions as an attack detecting means. A director 6 which functions as a processing means for controlling the firewall 2 is connected to the sensor 5. Each of the sensor 5 and the director 6 comprises a computer.

The sensor 5 comprises a UNIX machine, for example, and is connected to the hub 4 via an Ethernet card 7. The sensor 5 runs installed software that is called tcpdump. The software tcpdump acquires or hears all IP packets passing through the hub 4 via the Ethernet card 7. Such an operation is often referred to as a promise cast mode. The sensor 5 stores the acquired IP packets together with time data of the acquisition times in a hard disk (not shown). When the total number of acquired IP packets stored in the hard disk reaches a predetermined allowable number, the sensor 5 deletes the oldest IP packet from the hard disk, and stores a newly acquired IP packet in the hard disk.

The sensor 5 is software-implemented not to respond to transmitted packets which demand a response, such as packets of ARP (Address Resolution Protocol) and RARP (Reverse Address Resolution Protocol) which have no IP addresses. Therefore, the sensor 5 is capable of receiving (reading) only IP packets.

The sensor 5 also runs installed software (hereinafter referred to as an attack detecting algorithm) for detecting attacks of first through sixth types. The attack detecting algorithm may be installed in the director 6, and the sensor 5 may process the attack detecting algorithm while sending data to and receiving data from the director 6.

The director 6 runs installed software for controlling the firewall 2 (hereinafter referred to as a filter control algorithm). The filter control algorithm controls the firewall 2 by appropriately rewriting data in the filter setting file depending on an attack detected by the sensor 5.

Operation of the system for monitoring the LAN 1 for a cracker attack will be described below.

While storing acquired IP packets in the hard disk, the sensor 5 performs the following processing in each cycle time: The sensor 5 classifies a plurality of IP packets at predetermined time intervals from the hard disk according to the values of source IP addresses and destination IP addresses, and stores the classified IP packets in a memory (not shown). Specifically, the sensor 5 puts together those IP packets which have the same source IP address and those IP packets which have the same destination address, of the plurality of IP packets at predetermined time intervals, and stores those IP packets in the memory (the set of IP packets that are thus put together will hereinafter be referred to as an IP packet group). The sensor 5 then effects an attack detecting process on the stored IP packets, and deletes the IP packets from the memory.

In each cycle time, IP packets stored in the memory has been acquired after a time upon elapse of a predetermined time from the time at which the oldest IP packet of those IP packet stored in the memory in a preceding cycle time was acquired.

The attack detecting process is effected by the sensor 5 in each cycle time according to the attack detecting algorithm, as follows:

The sensor 5 detects an attack of the first type, i.e., a port scan, of attacks of the first through sixth types. Specifically, the sensor 5 extracts the values of all destination IP addresses (which are the values of IP addresses belonging to the LAN 1) of IP packets contained in each IP packet group whose source IP addresses are the same as each other and are external to the LAN 1, among the IP packets stored in the memory. The sensor 5 then counts the number of IP packets which have the same destination IP address as the value of each destination IP address extracted in each IP packet group, whose destination port numbers in a TCP header or an UDP header are different from each other, and which have been acquired in a continuous time, e.g., of 30 seconds, from the IP packet group (the IP packet group having the same source IP address).

If the counted number reaches a predetermined number, e.g., 20, then the sensor 5 detects a port scan attack. The sensor 5 gives data indicative of the port scan attack and the data of the values of the source IP addresses of the IP packet group whose attack has been detected (the data will hereinafter be referred to as detected first-type attack data) to the director 6.

The above process is effected successively on all the IP packet groups whose source IP addresses are the same as each other and do not belong to the LAN 1.

In the detection of a port scan according to the illustrated embodiment, the number of IP packets whose destination port numbers are different from each other is counted. However, a port scan may be detected as follows: The values of all destination port numbers of IP packets contained in each IP packet group whose source IP addresses are the same as each other and are external to the LAN 1 are extracted. Then, the number of IP packets which have the same destination port number as the value of each extracted destination port number, whose destination IP addresses are different from each other, and which have been acquired in a continuous time is counted from the IP packet group from which the destination port numbers have been extracted. If the counted number reaches a predetermined number, then a port scan is detected.

The director 6, which has been supplied with the detected first-type attack data from the sensor 5, rewrites the filter setting file of the firewall 2 in order to prevent IP packets having the same source IP addresses as the source IP addresses contained in the detected first-type attack data from entering the LAN 1 for a predetermined time, e.g., of 5 minutes, from the present time. At this time, when the IP packets having the above source IP addresses are transmitted, the firewall 2 discards those IP packets to prevent them from entering the LAN 1. Accordingly, the LAN 1 is protected against a port scan attack.

If the director 6 is supplied again with the same detected first-type attack data as the previously given detected first-type attack data from the sensor 5 before the above predetermined time of 5 minutes elapses, then the director 6 controls the firewall 2 in order to prevent IP packets from the source IP addresses of the detected first-type attack data from entering the LAN 1 for the predetermined time of 5 minutes from the time at which the director 6 is supplied again with the detected first-type attack data. If the director 6 is not supplied with detected first-type attack data before the above predetermined time of 5 minutes elapses, then the director 6 cancels the blocking of IP packets from the source IP addresses of the detected first-type attack data against entry into the LAN 1.

Having carried out the process of detecting a port scan attack as described above, the sensor 5 effects a process of detecting an attack of the second type (Syn-flood).

In this detecting process, the sensor 5 successively extracts Syn IP packets, in the order of acquisition times thereof, contained in each IP packet group of destination IP addresses belonging to the LAN 1, of IP packet groups whose destination IP addresses are the same as each other. The sensor 5 then checks whether Syn IP packets acquired within a predetermined time, e.g., of 2 seconds from the acquisition time of each extracted Syn IC packet are present or not in the IP packet group whose destination IP addresses are the same as each other. If such Syn IP packets are present, then the sensor 5 counts the number of those Syn IP packets including previously extracted Syn IP packets. The sensor 5 then checks whether an Ack IP packet corresponding to each of the counted Syn IP packets (specifically, an Ack IP packet having the same source IP address as the Syn IP packet and having a sequence number next to the sequence number in the TCP header of the Syn IP packet) and acquired within the predetermined time of 2 seconds from the acquisition time of the Syn IP packet is present or not in the IP packet group whose destination IP addresses are the same as each other. If such an Ack IP packet is present, then the sensor 5 decrements the above counted number by "1". When the presence of corresponding Ack IP packets has finally been checked, if the counter number is equal to or greater than a predetermined number, i.e., 16, then the sensor 5 detects a Syn-flood attack. The sensor 5 gives data indicative of the Syn-flood attack and the data of the values of the source IP addresses and the data of the values of the destination IP addresses of the Syn IP packet group whose attack has been detected (the data will hereinafter be referred to as detected second-type attack data) to the director 6.

The above process is effected successively on all the IP packet groups whose destination IP addresses are the same as each other and belong to the LAN 1.

In the illustrated embodiment, a Syn-flood attack is detected on the basis of the number of Syn IP packets. However, a Syn-flood attack may be detected as follows: Syn/Ack IP packets contained in each IP packet group whose source IP addresses are the same as each other and belong to the LAN 1 are successively extracted in the order of acquisition times thereof. Then, it is checked whether Syn/Ack IP packets acquired within a predetermined time, e.g., of 2 seconds from the acquisition time of each extracted Syn/Ack IC packet are present or not in the IP packet group whose source IP addresses are the same as each other. If such Syn/Ack IP packets are present, then the number of those Syn/Ack IP packets including previously extracted Syn/Ack IP packets is counted. Then, an IP packet group having the same destination IP addresses as the source IP address of each of the counted Syn/Ack IP packets is checked. It is checked whether an Ack IP packet corresponding to each of the Syn/Ack IP packets (specifically, a Syn/Ack IP packet having the same destination IP address as the source IP address of the Syn/Ack IP packet and having an Ack number next to the sequence number in the TCP header of the Syn/Ack IP packet) and acquired within the predetermined time of 2 seconds from the acquisition time of the Syn/Ack IP packet is present or not in the IP packet group. If such an Ack IP packet is present, then the above counted number is decremented by "1". When the presence of corresponding Ack IP packets has finally been checked, if the counter number is equal to or greater than a predetermined number, i.e., 16, then a Syn-flood attack is detected.

In the above case, the data given from the sensor to the director 6 include data indicative of the detected Syn-flood attack and the data of the values of the source IP addresses and the data of the values of the destination IP addresses of the Syn/Ack IP packet group. The data of the values of the source IP addresses and destination IP addresses of the Syn/Ack IP packet group correspond respectively to the data of the values of the source IP addresses and the data of the values of the destination IP addresses of the Syn IP packets in the detected second-type attack data described above.

The director 6, which has been supplied with the detected second-type attack data from the sensor 5, rewrites the filter setting file of the firewall 2 in order to prevent IP packets having the same source IP addresses as the source IP addresses contained in the detected second-type attack data from entering the LAN 1 for a predetermined time, e.g., of 2 minutes, from the present time. At the same time, the director 6 rewrites the filter setting file of the firewall 2 in order to prevent IP packets having the same destination IP addresses as the destination IP addresses contained in the detected second-type attack data from entering the LAN 1 for a predetermined time, e.g., of 2 seconds, from the present time. At this time, when the IP packets having the above source IP addresses or the IP packets having the above destination IP addresses are transmitted from the Internet 3, the firewall 2 discards those IP packets to prevent them from entering the LAN 1. Accordingly, the LAN 1 is protected against a Syn-flood attack, and hosts having the IP addresses which are under attack do not go down, but return to their normal state.

As in the process of detecting a port scan attack, if the director 6 is supplied again with the same detected second-type attack data as the previously given detected second-type attack data from the sensor 5 before the above predetermined time of 2 minutes, required to preclude IP packets having the source IP addresses of the detected second-type attack data, elapses, then the director 6 controls the firewall 2 in order to prevent IP packets from the source IP addresses of the detected second-type attack data from entering the LAN 1 for the predetermined time of 2 minutes from the time at which the director 6 is supplied again with the detected second-type attack data. This holds true for the exclusion of IP packets having the destination IP addresses of the detected second-type attack data. Therefore, insofar as a Syn-flood attack continues, IP packets from the source IP addresses of the Syn-flood attack or IP packets to the destination IP addresses of the Syn-flood attack cannot enter the LAN 1. With respect to the exclusion of IP packets having the source IP addresses of the detected second-type attack data and the exclusion of IP packets having the destination IP addresses of the detected second-type attack data, if the director 6 is not supplied with detected second-type attack data before the above predetermined times of 2 minutes and 2 seconds elapse, then the director 6 cancels the blocking of IP packets having the source IP addresses of the detected second-type attack data against entry into the LAN 1, and also cancels the blocking of IP packets having the destination IP addresses of the detected second-type attack data against entry into the LAN 1.

Having carried out the process of detecting a Syn-flood attack as described above, the sensor 5 effects a process of detecting an attack of the third type (Teardrop).

In this detecting process, the sensor 5 successively extracts divided IP packets contained in each IP packet group of destination addresses belonging to the LAN 1, of IP packet groups whose destination IP addresses are the same as each other. According to IP, a certain flag in the IP header of each divided packet is either "1" or data referred to as a fragment offset is of a value greater than "0". A divided packet can be located based on this principle. The sensor 5 checks whether divided packets (which are the same as the extracted divided packets) acquired within a predetermined time, e.g., of 5 minutes from the acquisition time of each extracted divided packet and having the same IP identification number in the IP header and the same fragment offset as the divided packet are present or not in the same IP packet group as the divided packet. If such divided packets are present, then the number of those divided packets including previously extracted divided packets is counted. If the counted number is equal to or greater than a predetermined number, e.g., 80, then the sensor 5 detects a Teardrop attack, and gives data indicative of the Teardrop attack and the data of the values of the source IP addresses and the data of the values of the destination IP addresses of the divided packets whose attack has been detected (the data will hereinafter be referred to as detected third-type attack data) to the director 6.

The above process is effected successively on all the IP packet groups whose destination IP addresses are the same as each other and belong to the LAN 1.

The director 6, which has been supplied with the detected third-type attack data from the sensor 5, controls the firewall 2 in exactly the same manner as when a Syn-flood attack is detected. Specifically, the director 6 rewrites the filter setting file of the firewall 2 in order to prevent IP packets having the same source IP addresses as the source IP addresses contained in the detected third-type attack data from entering the LAN 1 for a predetermined time of 2 minutes, from the present time. At the same time, the director 6 rewrites the filter setting file of the firewall 2 in order to prevent IP packets having the same destination IP addresses as the destination IP addresses contained in the detected third-type attack data from entering the LAN 1 for a predetermined time of 2 seconds, from the present time.

Accordingly, the LAN 1 is protected against a Teardrop attack, and hosts having the IP addresses which are under attack do not go down, but return to their normal state.

Having carried out the process of detecting a Teardrop attack as described above, the sensor 5 effects a process of detecting an attack of the fourth type (Land).

In this detecting process, the sensor 5 extracts IP packets having the same source IP addresses as the same values as the destination IP addresses of each IP packet group of destination IP addresses belonging to the LAN 1, of IP packet groups whose destination IP addresses are the same as each other. The sensor 5 then checks whether IP packets having the same source IP addresses as the extracted IP packets and acquired within a predetermined time, e.g., of 2 minutes from the acquisition time of the IP packets are present or not in IP packet groups having the same destination IP addresses as the extracted IP packets. If such IP packets are present, then the sensor 5 counts the number of those IP packets including previously extracted IP packets. If the counted number is equal to or greater than a predetermined number, e.g., 6, then the sensor 5 detects a Land attack, and gives data indicative of the land attack and the data of the values of the source IP addresses of the IP packet group whose attack has been detected (the data will hereinafter be referred to as detected fourth-type attack data) to the director 6.

The above process is effected successively on all the IP packet groups whose destination IP addresses are the same as each other and belong to the LAN 1.

The director 6, which has been supplied with the detected fourth-type attack data from the sensor 5, rewrites the filter setting file of the firewall 2 in order to prevent IP packets having the same source IP addresses as the source IP addresses contained in the detected fourth-type attack data and having the same destination IP addresses as those source IP addresses from entering the LAN 1 for a predetermined time, e.g., 3 minutes, from the present time. When IP packets having the above source IP addresses and destination IP addresses are transmitted from the Internet 3, the firewall 2 discards the IP packets and hence prevents them from entering the LAN 1. In this fashion, the LAN 1 is protected against a Land attack.

As in the process of detecting a port scan attack, if the director 6 is supplied again with the same detected fourth-type attack data as the previously given detected fourth-type attack data from the sensor 5 before the above predetermined time of 6 minutes, required to preclude IP packets having the same source IP addresses and destination IP addresses as the source IP addresses of the detected fourth-type attack data elapses, then the director 6 controls the firewall 2 in order to prevent IP packets having the source IP addresses and destination IP addresses of the detected fourth-type attack data from entering the LAN 1 for the predetermined time of 6 minutes from the time at which the director 6 is supplied again with the detected fourth-type attack data. Therefore, insofar as a Land attack continues, IP packets from the source IP addresses and destination IP addresses of the Land attack cannot enter the LAN 1. If the director 6 is not supplied with detected fourth-type attack data before the above predetermined time of 6 minutes elapses, then the director 6 cancels the blocking of IP packets having the same source IP addresses and destination IP addresses as the source IP addresses of the detected fourth-type attack data against entry into the LAN 1.

In the illustrated embodiment, the data of the values of the source IP addresses of IP packets under a Land attack are given as detected fourth-type attack data to the director 6. However, because source IP addresses and destination IP addresses of IP packets under a Land attack are of the same value, the data of the values of the destination IP addresses of IP packets under a Land attack, rather than the data of the values of the source IP addresses thereof, may be given to the director 6.

Having carried out the process of detecting a Land attack as described above, the sensor 5 effects a process of detecting an attack of the fifth type (password acquisition).

In this detecting process, the sensor 5 extracts IP packets including user name data and password data of hosts of the LAN 1 from each IP packet group of destination IP addresses belonging to the LAN 1, of IP packet groups whose destination IP addresses are the same as each other. The sensor 5 then counts the number of IP packets whose user name data are the same as each other, whose password data are different from each other, and which have been acquired within a continuous time, e.g., 2 minutes, among the extracted IP packets. If the counter number is equal to or greater than a predetermined number, e.g., 20, then the sensor 5 detects an attack of the fifth type for a cracker to acquire password. The sensor 5 gives data indicative of the attack of the fifth type and the data of the values of the source IP addresses and the data of the values of the destination IP addresses of the IP packets whose attack has been detected (the data will hereinafter be referred to as detected fifth-type attack data) to the director 6.

The above process is effected successively on all the IP packet groups whose destination IP addresses are the same as each other and belong to the LAN 1.

The director 6, which has been supplied with the detected fifth-type attack data from the sensor 5, rewrites the filter setting file of the firewall 2 in order to prevent IP packets having the same source IP addresses and destination IP addresses as the source IP addresses and destination IP addresses of the detected fifth-type attack data from entering the LAN 1 for a predetermined time, e.g., 1 hour, from the present time. When IP packets having the above source IP addresses and destination IP addresses are transmitted from the Internet 3, the firewall 2 discards the IP packets and hence prevents them from entering the LAN 1. In this fashion, the LAN 1 is protected against an attack of the fifth type trying to acquire password.

As in the process of detecting a port scan attack, if the director 6 is supplied again with the same detected fifth-type attack data as the previously given detected fifth-type attack data from the sensor 5 before the above predetermined time of 1 hour, required to preclude IP packets having the source IP addresses and destination IP addresses of the detected fifth-type attack data, elapses, then the director 6 controls the firewall 2 in order to prevent IP packets from the source IP addresses and destination IP addresses of the detected fifth-type attack data from entering the LAN 1 for the predetermined time of 1 hour from the time at which the director 6 is supplied again with the detected fifth-type attack data. Therefore, insofar as an attack of the fifth type continues, IP packets having the source IP addresses and destination IP addresses of the attack of the fifth type cannot enter the LAN 1. If the director 6 is not supplied with detected fifth-type attack data before the above predetermined time of 1 hour elapses, then the director 6 cancels the blocking of IP packets having the source IP addresses and destination IP addresses of the detected fifth-type attack data against entry into the LAN 1.

Having carried out the process of detecting an attack of the fifth type as described above, the sensor 5 effects a process of detecting an attack of the sixth type (security hole attack).

In this detecting process, the sensor 5 searches for an IP packet having a printer logical name "lpr" and a data size of 128 characters or more from each IP packet group of destination IP addresses belonging to the LAN 1, of IP packet groups whose destination IP addresses are the same as each other. If such an IP packet is found, then the sensor 5 detects an attack of the sixth type on a through hole in a host in the LAN 1. The sensor 5 gives data indicative of the attack of the sixth type and the data of the value of the source IP address and the data of the value of the destination IP address of the IP packet whose attack has been detected (the data will hereinafter be referred to as detected sixth-type attack data) to the director 6.

The director 6, which has been supplied with the detected sixth-type attack data from the sensor 5, rewrites the filter setting file of the firewall 2 in order to prevent IP packets having the same source IP addresses and destination IP addresses as the source IP address and destination IP address of the detected sixth-type attack data from entering the LAN 1 for a predetermined time, e.g., 4 hours, from the present time. When IP packets having the above source IP addresses and destination IP addresses are transmitted from the Internet 3, the firewall 2 discards the IP packets and hence prevents them from entering the LAN 1. In this fashion, the LAN 1 is protected against an attack of the sixth type on a through hole in a host in the LAN 1.

As in the process of detecting a port scan attack, if the director 6 is supplied again with the same detected sixth-type attack data as the previously given detected sixth-type attack data from the sensor 5 before the above predetermined time of 4 hours, required to preclude IP packets having the source IP addresses and destination IP addresses of the detected sixth-type attack data, elapses, then the director 6 controls the firewall 2 in order to prevent IP packets from the source IP addresses and destination IP addresses of the detected sixth-type attack data from entering the LAN 1 for the predetermined time of 4 hours from the time at which the director 6 is supplied again with the detected sixth-type attack data. Therefore, insofar as an attack of the sixth type continues, IP packets having the source IP addresses and destination IP addresses of the attack of the sixth type cannot enter the LAN 1. If the director 6 is not supplied with detected sixth-type attack data before the above predetermined time of 4 hours elapses, then the director 6 cancels the blocking of IP packets having the source IP addresses and destination IP addresses of the detected sixth-type attack data against entry into the LAN 1.

As described above, the system for monitoring the LAN 1 for a cracker attack according to the above embodiment incorporates only the sensor 5 and the director 6 for detecting various attacks made by crackers against the LAN 1 on a real-time basis and automatically and quickly taking appropriate measures to protect the LAN 1 against the detected attacks. Therefore, the network administrator or the like of the LAN 1 is allowed to greatly reduce an expenditure of labor that is required to construct the LAN 1 in view of cracker attacks and to frequently refer to a log file, and hence is allowed to lower the cost of maintaining and managing the LAN 1. Since various attacks made by crackers against the LAN 1 can be detected on a real-time basis, it is not necessary to limit communications between the LAN 1 and external networks when no attacks are detected. Usually, therefore, the freedom of communications of the LAN 1 can be increased, and information resources on the Internet can effectively be utilized.

In the illustrated embodiment, the firewall 3 is connected to the gateway of the LAN 1, and when a cracker attack on the LAN 1 is detected, the firewall 3 is controlled to automatically preclude the detected attack. However, when a cracker attack on the LAN 1 is detected, the detected attack may only be reported to the network administrator of the LAN 1 or a security manager assigned to the LAN 1.

According to such a modification, the director 6 or the sensor 5 is connected via a public or dedicated circuit to the host of the network administrator or the security manager. When a cracker attack on the LAN 1 is detected, information such as the detected first through sixth attack data is transmitted from the director 6 or the sensor 5 to the host of the network administrator or the security manager. In this case, a specific measure required to protect the LAN 1 against the detected attack is taken directly by the network administrator or the security manager. Because the network administrator or the security manager is needed to take a necessary preventive action when the detected attack is reported and also because the type of the attack is detected, the network administrator or the security manager can take such an action against the attack relatively easily.

In the illustrated embodiment, the processes of detecting attacks of the first through sixth types have been described as being successively carried out. However, the processes of detecting attacks of the first through sixth types may be performed parallel to each other.

In the above embodiment, the system for monitoring the network for cracker attacks such as Syn-flood, Teardrop, and Land attacks among those belonging to DoS (Denial of Service). However, the principles of the present invention are also applicable to the detection of cracker attacks known as Smurf and Floodie attacks.

Although a certain preferred embodiment of the present invention has been shown and described in detail, it should be understood that various changes and modifications may be made therein without departing from the scope of the appended claims.

What is claimed is:

1. A system for monitoring a network which performs communications based on IP (Internet Protocol), for a cracker attack, comprising:

attack detecting means disposed at a gateway of the network, for successively acquiring IP packets passing through the gateway, storing the acquired IP packets accumulatively, and monitoring the stored IP packets while said gateway remains open to detect a cracker attack against the network; and processing means for effecting a predetermined process depending on the detected type of cracker attack when the attack detecting means detects the cracker attack, wherein said processing means comprises means for preventing an IP packet having a source IP address and/or a destination IP address associated with the attack detected by the attack detecting means from entering the network in the predetermined process, for a predetermined time after the attack detecting means detects the attack, and when said predetermined time has elapsed after said detecting means detects said attack, reopening said gateway for allowing an IP packet having a source IP address and/or a destination IP address associated with said attack to enter said network.

2. A system according to claim 1, wherein said attack detecting means comprises means for receiving all IP packets passing through the gateway of the network.

3. A system according to claim 2, wherein said attack detecting means comprises means for receiving only IP packets.

4. A system according to claim 1, wherein said attack detecting means comprises means for holding an algorithm for detecting a plurality of different types of cracker attacks, and detecting the types of cracker attacks from the IP packets acquired and stored by the attack detecting means based on said algorithm.

5. A system according to claim 4, wherein said attack detecting means comprises means for classifying a plurality of the IP packets acquired and stored by the attack detecting means according to at least source IP addresses and/or destination IP addresses, and detecting the types of cracker attacks from the classified IP packets.

6. A system according to claim 1, wherein said attack detecting means comprises means for detecting a cracker attack of a first type when the IP packets acquired and stored by the attack detecting means include at least a predetermined number of IP packets which are transmitted to the network from an external network within a predetermined time, and whose at least source IP addresses are the same as each other, and whose destination IP addresses or destination port numbers are different from each other, and wherein said processing means comprises means for preventing an IP packet having the same source IP address as the source IP addresses associated with the attack of the first type detected by the attack detecting means, from entering the network for a predetermined time after the attack detecting means detects the attack of the first type, in the predetermined process.

7. A system according to claim 1, wherein said attack detecting means comprises means for detecting a cracker attack of a fourth type when the IP packets acquired and stored by the attack detecting means include at least a predetermined number of IP packets, which are transmitted to the network from an external network within a predetermined time, and whose source IP addresses are the same as destination IP addresses thereof, and wherein said processing means comprises means for preventing an IP packet having the same source IP address and destination IP address as each of the IP packets associated with the attack of the fourth type from entering the network for a predetermined time after the attack detecting means detects the attack of the fourth type, in the predetermined process.

8. A system according to claim 1, wherein said attack detecting means comprises means for detecting a cracker attack of a fifth type when the IP packets acquired and stored by the attack detecting means include at least a predetermined number of IP packets, which are transmitted to the network from an external network within a predetermined time in order to operate a host in the network, and whose user name data of the host are the same as each other and whose passwords of the host are different from each other, and wherein said processing means comprises means for preventing an IP packet having the same source IP address and destination IP address as each said IP packet associated with the attack of the fifth type from entering said network for a predetermined time after said attack detecting means detects the attack of the fifth type, in the predetermined process.

9. A system according to claim 1, wherein said attack detecting means comprises means for detecting a cracker attack of a sixth type when the IP packets acquired and stored by the attack detecting means include an IP packet which has a data sequence having a predetermined pattern of data for attacking a buffer overflow security hole, and wherein said processing means comprises means for preventing an IP packet having the same source IP address and destination IP address as the IP packet associated with the attack of the sixth type from entering the network for a predetermined time after the attack detecting means detects the attack of the sixth type, in the predetermined process.

10. A system according to claim 1, wherein said processing means comprises means for generating a report output representing the detection of the cracker attack in the predetermined process.

11. A system according to claim 1, wherein said attack detecting means comprises means for detecting a cracker attack of a second type when the IP packets acquired and stored by the attack detecting means include at least a predetermined number of Syn IP packets based on TCP (Transmission Control Protocol), which are transmitted to the network from an external network within a predetermined time, and whose at least destination IP addresses are the same as each other, and when an Ack IP packet based on the TCP which has the same source IP address and destination IP address as each of the Syn IP packets is not acquired within said predetermined time, and wherein said processing means comprises means for preventing an IP packet having the same destination IP address as each said Syn IP packet from entering said network for a predetermined time after said attack detecting means detects the attack of the second type, in said predetermined process.

12. A system according to claim 11, wherein said processing means comprises means for preventing an IP packet having the same source IP address as each said Syn IP packet from entering said network for a predetermined time after said attack detecting means detects the attack of the second type in said predetermined process.

13. A system according to claim 12, wherein said predetermined time for which an IP packet having the same source IP address as each said Syn IP packet is prevented from entering said network is longer than said predetermined time for which an IP packet having the same destination IP address as each said Syn IP packet is prevented from entering said network.

14. A system according to claim 1, wherein said attack detecting means comprises means for detecting a cracker attack of a second type when the IP packets acquired and stored by the attack detecting means include at least a predetermined number of Syn/Ack IP packets based on TCP (Transmission Control Protocol), which are transmitted to the network from an external network within a predetermined time, and whose at least destination IP addresses are the same as each other, and when an Ack IP packet based on the TCP which has the same source IP address and destination IP address as the source IP address and destination IP address of each of said Syn/Ack IP packets is not acquired within the predetermined time, and wherein said processing means comprises means for preventing an IP packet having the same destination IP address as the source IP address of each said Syn/Ack IP packet from entering said network for a predetermined time after said attack detecting means detects the attack of the second type, in said predetermined process.

15. A system according to claim 14, wherein said processing means comprises means for preventing an IP packet having the same source IP address as the destination IP address of each said Syn/Ack IP packet from entering said network for a predetermined time after said attack detecting means detects the attack of the second type, in said predetermined process.

16. A system according to claim 15, wherein said predetermined time for which an IP packet having the same source IP address as the destination IP address of each said Syn/Ack IP packet is prevented from entering said network is longer than said predetermined time for which an IP packet having the same destination IP address as the source IP address of each said Syn/Ack IP packet is prevented from entering said network.

17. A system according to claim 1, wherein said attack detecting means comprises means for detecting a cracker attack of a third type when the IP packets acquired and stored by the attack detecting means include at least a predetermined number of same divisions of an IP packet, which are transmitted to the network from an external network, and wherein said processing means comprises means for preventing an IP packet having the same destination IP address as the destination IP address of each said divided IP packet from entering said network for a predetermined time after said attack detecting means detects the attack of the third type, in said predetermined process.

18. A system according to claim 17, wherein said processing means comprises means for preventing an IP packet having the same source IP address as the source IP address of each said divided IP packet from entering said network for a predetermined time after said attack detecting means detects the attack of the third type, in said predetermined process.

19. A system according to claim 18, wherein said predetermined time for which an IP packet having the same source IP address as the source IP address of each said divided IP packet is prevented from entering said network is longer than the predetermined time for which an IP packet having the same destination IP address as the destination IP address of each the divided IP packet is prevented from entering said network.

20. A system for monitoring a network which performs communications based on IP (Internet Protocol), for a cracker attack, comprising:

attack detecting means disposed at a gateway of the network, for successively acquiring IP packets passing through the gateway, storing the acquired IP packets accumulatively, holding an algorithm for detecting a plurality of different types of cracker attacks, and monitoring the acquired and stored IP packets while said gateway remains open to detect the types of cracker attacks from the acquired and stored IP packets based on the algorithm; and processing means for preventing an IP packet having a source IP address and/or a destination IP address associated with the attack detected by the attack detecting means from entering the network according to a predetermined process, for a predetermined time which is predetermined corresponding to the detected type of attack, after the attack detecting means detects one of the attacks, and when said predetermined time has elapsed after said detecting means detects said attack, reopening said gateway for allowing an IP packet having a source IP address and/or a destination IP address associated with said attack to enter said network.

21. A system according to any one of claims 1, 6 to 9, 12, 13, 15, 16, 18, 19 or 20, further comprising a packet filter disposed at the gateway of the network, for selectively establishing IP packets to be prevented from entering the network, the processing means comprising means for controlling the packet filter to perform the predetermined process.

* * * * *